(12) United States Patent
Marxkors et al.

(10) Patent No.: US 11,565,391 B2
(45) Date of Patent: Jan. 31, 2023

(54) INSTALLATION TOOL FOR A WIRE THREAD INSERT

(71) Applicant: BÖLLHOFF VERBINDUNGSTECHNIK GmbH, Bielefeld (DE)

(72) Inventors: Andreas Marxkors, Hövelhof (DE); Holger Thommes, Strohn (DE); Hermann Zimmermann, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 622 days.

(21) Appl. No.: 16/470,737

(22) PCT Filed: Nov. 8, 2017

(86) PCT No.: PCT/EP2017/078602
§ 371 (c)(1),
(2) Date: Jun. 18, 2019

(87) PCT Pub. No.: WO2018/114122
PCT Pub. Date: Jun. 28, 2018

(65) Prior Publication Data
US 2020/0086466 A1    Mar. 19, 2020

(30) Foreign Application Priority Data

Dec. 22, 2016    (DE) .......................... 102016125481.9

(51) Int. Cl.
*B25B 27/14*    (2006.01)
*F16B 37/12*    (2006.01)

(52) U.S. Cl.
CPC ............ *B25B 27/143* (2013.01); *F16B 37/12* (2013.01); *Y10T 29/53691* (2015.01)

(58) Field of Classification Search
CPC ........................ B25B 27/143; Y10T 29/53691
See application file for complete search history.

(56) References Cited

U.S. PATENT DOCUMENTS 6,000,114 A    12/1999  Newton et al.
6,877,401 B1    4/2005  Giltner
(Continued)

FOREIGN PATENT DOCUMENTS

CN    101952085 A    1/2011
DE    1016066 B    9/1957
(Continued)

OTHER PUBLICATIONS

English translation of the International Preliminary Report on Patentability for PCT/EP2017/078602 dated Jun. 25, 2019, (6 pages).

(Continued)

*Primary Examiner* — Jason L Vaughan
*Assistant Examiner* — Amanda Kreiling
(74) *Attorney, Agent, or Firm* — Reising Ethington P.C.; Matthew J. Schmidt

(57) ABSTRACT

A tool for installing or removing a wire thread insert. This tool includes a spindle body having an actuator which can be moved axially therein. The actuator interacts with an entraining blade. By the axial movement of the actuator, the entraining blade can be extended out of the axial recess and retracted back into it.

20 Claims, 12 Drawing Sheets

(56) References Cited

U.S. PATENT DOCUMENTS

Figure 1:
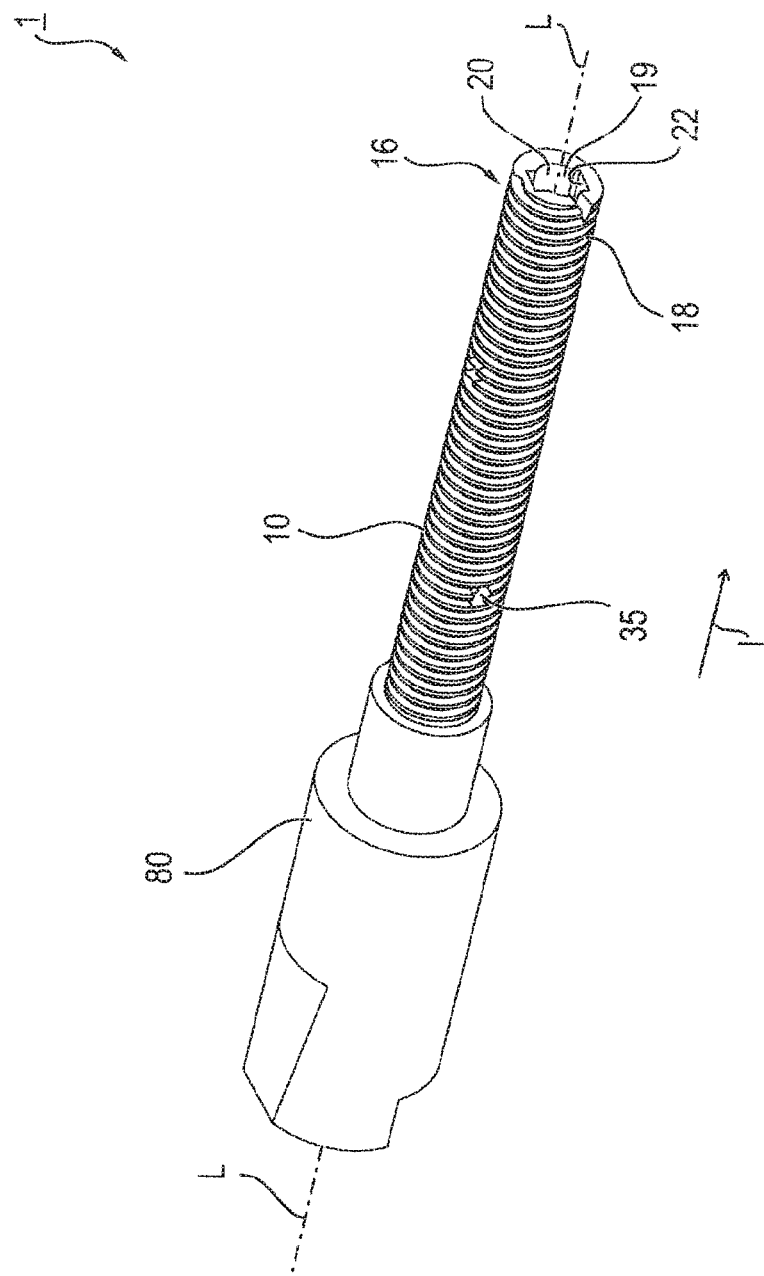

| | | |
|---|---|---|
| 8,241,156 B2 | 8/2012 | Sims et al. |
| 8,869,372 B2 | 10/2014 | Luneau et al. |
| 9,421,676 B2 | 8/2016 | Hondo |
| 9,719,546 B2 | 8/2017 | Thommes et al. |
| 9,764,454 B2 * | 9/2017 | Thommes ............. B25B 27/143 |
| 2010/0104396 A1 | 4/2010 | Hama et al. |
| 2015/0096160 A1 * | 4/2015 | Hondo ................... B25B 27/00 29/283 |
| 2017/0284444 A1 | 10/2017 | Thommes et al. |
| 2017/0284445 A1 | 10/2017 | Thommes et al. |
| 2017/0284446 A1 | 10/2017 | Thommes et al. |

FOREIGN PATENT DOCUMENTS

| | | |
|---|---|---|
| DE | 20100272 U1 | 4/2001 |
| DE | 102010050735 A1 | 5/2012 |
| DE | 102011051846 A1 | 1/2013 |
| EP | 0153266 A2 * | 8/1985 |
| EP | 0153267 A2 | 8/1985 |
| EP | 0153266 B1 | 1/1990 |
| EP | 0615818 B1 | 5/1996 |
| EP | 1838499 B1 | 8/2008 |
| JP | 2010101430 A | 5/2010 |
| JP | 2012115965 A | 6/2012 |
| JP | 2014520678 A | 8/2014 |
| WO | WO2013180039 A1 | 12/2013 |
| WO | WO2015157165 A3 | 10/2015 |

OTHER PUBLICATIONS

CN Office Action for CN Application No. 201780080365.1 dated Jul. 13, 2020 (6 pages).
CN Notice of Allowance for CN Application No. 201780080365.1 dated Nov. 30, 2020 (4 pages).
KR Office Action for KR Application No. 10-2019-7021239 dated Dec. 28, 2020 (6 pages).
Written Opinion & International Search Report for PCT/EP2017/078602 dated Feb. 27, 2018, 11 pages.

* cited by examiner

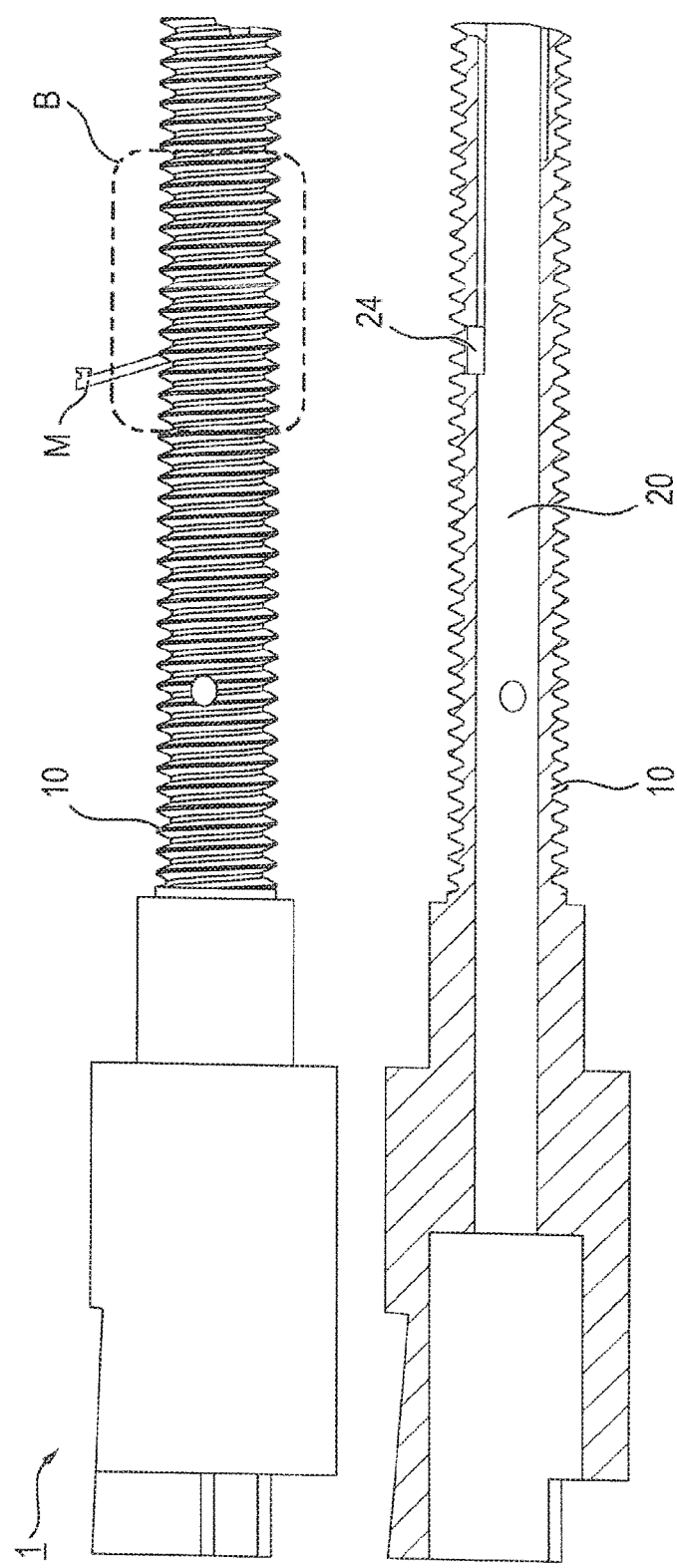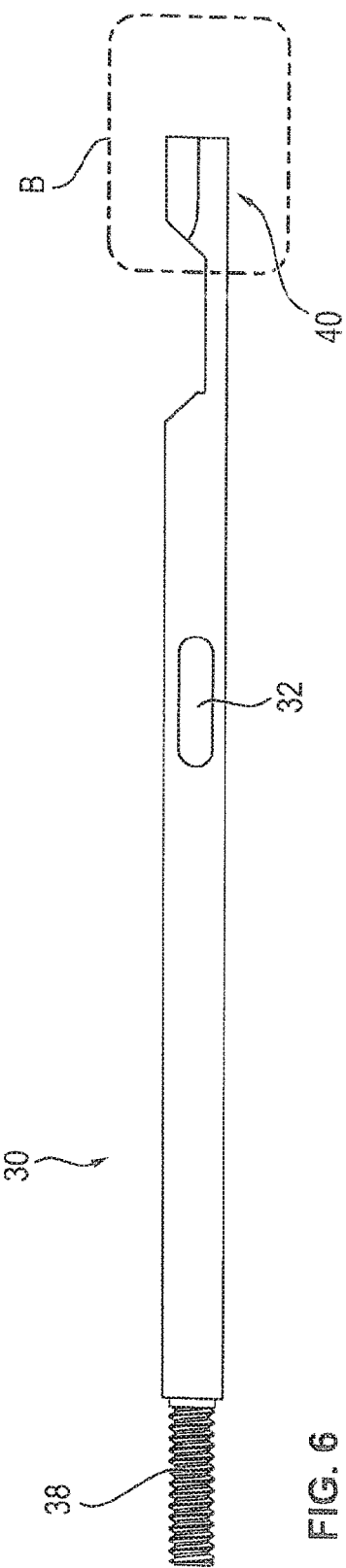
FIG. 5
FIG. 6

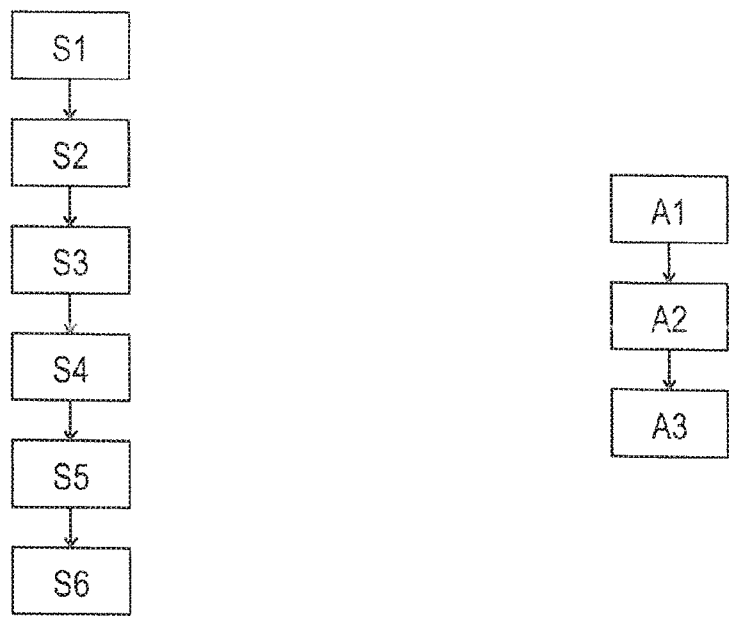
FIG. 14
FIG. 15
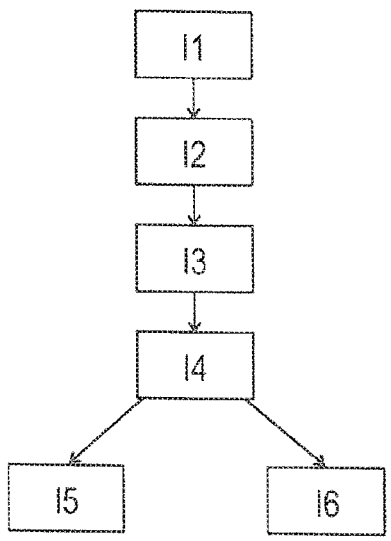
FIG. 16

INSTALLATION TOOL FOR A WIRE THREAD INSERT

1. TECHNICAL FIELD

The present disclosure relates to a tool for installing or removing a wire thread insert in a component opening with a thread. Furthermore, the present disclosure relates to an entraining blade which is used in this tool. In addition, the present disclosure is directed towards a manufacturing method for the above-mentioned tool for installing or removing a wire thread insert, a method for replacing the entraining blade in the tool and an installation method in order to be able to install the wire thread insert in the thread opening by means of the tool.

2. BACKGROUND

In the prior art, wire thread inserts are generally known. These are used in component openings with threads to reinforce these threads. This is necessary, for example, if the component consists of a relatively soft material such as plastic. The reinforcing wire thread insert in the thread opening then absorbs the mechanical stresses occurring when fastening a threaded element and distributes these gently to the component material surrounding the component opening.

In order to be able to install these wire thread inserts in the thread openings, various installation tools are known in the prior art. These installation tools consist of an installation spindle on the end of which the wire thread insert is either plugged onto or screwed on. In addition, well-known installation tools have an entraining blade arranged inside the installation spindle. Generally, despite different construction methods of the installation tools, these have the problem that the installation spindle and the entraining blade are exposed to considerable wear. This is disadvantageous in that the installation tools used must be completely replaced.

DE 1 016 066 describes an installation tool with an installation spindle. A thread is provided at the installation end of the installation spindle onto which the wire thread insert to be installed is screwed. At the local end face of the installation spindle, a radially extending gap is arranged, in which the installation tang of the wire thread insert interlocks. For this, the installation tang of the wire thread insert protrudes radially inwards. After the wire thread insert has been screwed sufficiently deep into the thread opening, a pin extending movably axially through the installation spindle releases the installation tang of the wire thread insert from the radial recess at the end face of the installation spindle. In the following, the installation tool can be unscrewed from the wire thread insert and thus from the thread opening. The disadvantage of this technical solution is that the radially inwardly projecting installation tang blocks the thread opening centrally after installation of the wire thread insert. Thus, threaded elements can only be screwed in up to the installation tang. This constructive arrangement limits the number of possible threaded elements that can be used here.

A further group of installation tools for wire thread inserts uses an installation spindle with a central axial recess. Within this axial recess, an entraining blade is fixedly arranged via a bolt or pin and can be pivoted. Such constructions are described for example in EP 0 615 818 B1, U.S. Pat. No. 6,000,114, EP 0 153 266 B1 and EP 0 153 267 B1. An engaging end of the entraining blade either projects beyond the axial end face of the installation spindle or pivots radially outwards via a window in the installation spindle. This special positioning enables the engaging end of the entraining blade to engage the wire thread insert to be installed. As soon as, for example, the engaging end of the entraining blade is worn out in these installation tools, the holding pin or bolt for the entraining blade must be removed by means of tools. Only then can the entraining blade be removed, replaced by a new entraining blade and reattached. Accordingly, extensive maintenance effort and the use of tools for releasing and reattaching the entraining blade is necessary. If the installation spindle is damaged, a replacement of the complete installation tool is even necessary.

In comparison to the installation tools described above, EP 1 838 499 B1 discloses an installation spindle in the axial recess of which the entraining blade is arranged so that it can be tilted via a knife-edge bearing. In this way, the entraining blade is no longer elaborately held by a pin or bolt installed in the installation tool, which in the case of maintenance would have to be elaborately removed by means of tools.

DE 10 2010 050 735 A1 describes another alternative of an installation tool for wire thread inserts. In this construction, the axial end face of the installation spindle is designed in such a manner that projections and/or shoulders on the end face engage the installation tang of the wire thread insert. In addition to the installation of the wire thread insert in the thread opening, this engagement also allows a movement, in this case a radial bending of the installation tang. For this purpose, the entraining blade is arranged and moved in such a manner that it provides an upsetting surface for the radial backward bending of the installation tang into the cylindrical spiral of the wire thread insert. Therefore, the entraining blade or the end of the entraining blade with the upsetting surface can be axially extended from the end face of the installation spindle. This indicates that the entraining blade implements its installation and/or removal function in accordance with the various constructional alternatives to prior art installation tools by projecting radially or axially from the installation spindle.

DE 10 2011 051 846 A1 describes a further construction alternative of an installation tool for wire thread inserts. The engaging end of the entraining blade used here protrudes radially outwards through a radial recess in the installation spindle. In case of wear on the engaging end of the entraining blade, it is manually possible to replace the entraining blade in the installation tool and in particular in the axial recess of the installation spindle. This is because the entraining blade is only fixed in the axial recess of the installation spindle via a snap or latch connection. This allows a quick and tool-free replacement of the entraining blade in the installation tool, which significantly reduces the maintenance effort for such installation tools for wire thread inserts.

It is the object of the present disclosure to further reduce the maintenance effort for installation tools of wire thread inserts.

3. SUMMARY

The above object is solved by a tool for installing or removing a wire thread insert, by an entraining blade for such a tool, by a manufacturing method for such a tool for installing or removing the wire thread insert, by a method for replacing the entraining blade in said tool for installing or removing the wire thread insert and a method for replacing the spindle body as well as by an installation method for a wire thread insert in a thread opening of a component with such a tool. Further embodiments and further developments are set forth in the following description, the accompanying drawings and the claims.

The tool for installing or removing a wire thread insert comprises the following features: a spindle body having a driving section, via which the spindle body can be rotated about a longitudinal axis, a receiving section arranged at the end and facing away from the driving section, in which a thread for screwing on or a threadless surface for plugging the wire thread insert onto the receiving section is provided, and an axial recess extending over a length inside the spindle body, an entraining blade with an engaging end which is arranged at least axially displaceable in the axial recess at least in the portion of the receiving section, and an elongated actuator which is arranged movably in the longitudinal direction within the axial recess so that the engaging end of the entraining blade can be displaced via the actuator between a first position within the spindle body and a second position outside the spindle body.

The installation and/or removal tool for wire thread inserts uses an axially displaceable actuator inside the installation spindle to actuate the entraining blade. Due to the movement of the actuator in the axial direction of the installation spindle, an engaging end of the entraining blade is at least axially selectively extended from the inside of the installation spindle. Based on this changed position of the engaging end, it is possible for the engaging end to engage a wire thread insert in order to selectively install and/or remove the same. For this purpose, an axial recess is provided within the entraining blade so that the actuator may extend over the entire length of the installation spindle. This construction makes it possible to actuate the actuator both manually and, according to a further construction, automatically in order to bring the engaging end of the entraining blade into engagement with the wire thread insert. Since the actuator is still preferably arranged so that it is movable only in the axial direction within the installation spindle, both the construction of the actuator as well as the guiding and fastening of the actuator within the installation spindle are of a simple construction. This is because while a single axial plug-in connection between the installation spindle and the actuator would be sufficient, it is preferred according to the invention to limit the axial actuating path of the actuator by means of a positive or form-fit connection. This ensures that the engaging end of the entraining blade can only be extended up to a defined point and can be retracted from this point in a defined manner.

According to a further embodiment of the tool described above, the recess extends over the entire length of the spindle body and the actuator extends within this recess from the driving section into the receiving section, wherein the axial movement of the actuator within the recess is limited by positive or form-fit locking. According to a further embodiment, the actuator comprises at an axial end a forward slider for actuating the entraining blade which encloses an angle <90° with a longitudinal axis of the spindle body.

The actuator within the installation spindle may have in a portion adjacent to the receiving section a plurality of adjusting faces or actuation faces arranged angularly with respect to the longitudinal axis of the actuator. These actuation faces are adapted to the specific interaction with the entraining blade. This is so because through the axial movement of the actuator, the engaging end of the entraining blade is specifically moved at least axially out of the installation spindle and is also retracted back into it. In the same way, at least one other actuation face implements a retention of the entraining blade inside the installation spindle. In this way it is ensured that the actuator does not completely slide the entraining blade out of the axial recess of the installation spindle, so that the entraining blade would be released from the installation spindle. Now, in order to be able to realize an extending of the engaging end of the entraining blade from the spindle body with the axial movement of the actuator, the at least one actuation face is arranged at an angle <90° with respect to the longitudinal axis of the actuator and the installation spindle. This actuation face may interact with an also inclined plane of the entraining blade. This interaction of the actuation faces realizes an effective force transmission and may also realize an alignment of the movement of the entraining blade during the extending of the engaging end from the axial recess of the installation spindle.

It further may be preferred that the spindle body of the tool includes a radial opening in which the entraining blade is held releasably in the axial direction of the spindle body. This radial opening is designed similar to a window in the radial outer side of the spindle body. Accordingly, the entraining blade may have a projection with an axial undercut, so that the actuator cannot slide the entraining blade completely out of the axial recess of the installation spindle. While this projection or the axial undercut supports itself in the above-mentioned radial window, the angularly arranged actuation face of the actuator may ensure an axial extending of the engaging end of the entraining blade and a combined radial extending of the engaging end of the entraining blade.

According to a further embodiment of the tool, the recess of the installation spindle has, at least in the receiving section, a first and a second radial groove which extend in the axial direction and of which at least the first radial groove supports the entraining blade and the second radial groove supports the actuator. The radial recess of the installation spindle may be structured in its radial edge portion. Such a structure is formed, for example, by the first and second radial grooves mentioned above. These radial grooves provide the possibility that at least parts of the actuator and the entraining blade are supported within this groove. This support function ensures that both the actuator and the entraining blade cannot be rotated about their longitudinal axes within the recess of the installation spindle. This provides the tool with additional stability when a torque is transmitted to the entraining blade and/or the actuator during the installation or removal of a wire thread insert.

It further may be preferred that the actuator comprises a backward slider for the entraining blade with which the entraining blade can be displaced into the recess via the actuator, wherein the backward slider is designed as an abutment face which encloses an obtuse angle with the longitudinal axis. In a similar manner to the actuation face described above for extending the engaging end of the entraining blade, a further actuation face in the form of a backward slider is provided. This backward slider interacts with an engaging face of the entraining blade in such a manner that the entraining blade is retracted or slid back into the axial inner recess of the installation spindle. While the entraining blade thus may retain its orientation within the axial recess of the installation spindle due to the radial groove, the actuator applies the axially displacing forces via actuation faces that are adapted to these. The backward slider may act similarly to a hook, wherein it interacts with an axial undercut against the installation direction for wire thread inserts on the entraining blade. As soon as the actuator moves in the axial direction to the driving section, the backward slider engages the entraining blade and moves it further into the axial recess of the installation spindle.

According to another embodiment of the tool, the entraining blade has, at an end facing away from the engaging end, a first and a second spring strut arranged in a V-shape, of which the first spring strut ensures that the engaging end is extended and the second spring strut ensures that the entraining blade moves in the recess.

According to the disclosure, it may be preferred that the V-shaped pair of spring struts is arranged opposite the engaging end of the entraining blade. A leg of the spring struts serves for engagement in the abovementioned radial opening of the spindle body. Within this radial opening, the one spring strut preferably forms a latching or an axial undercut, so that the entraining blade cannot be pushed out of the axial recess of the installation spindle. The other spring strut may engage the backward slider of the actuator as soon as the actuator is moved in the direction of the driving section. It follows from this that the shape of the entraining blade may be adapted to the shape of the actuator in order to realize an effective extending of the engaging end from the axial recess and a retracting of the engaging end into the axial recess.

According to another embodiment of the tool, the driving section comprises an integral or separate tool holder or collet with a sleeve nut to fasten the installation spindle. According to another embodiment, the entraining blade is replaceably fastened in the tool. In addition, the spindle body is preferably not integrally connected to the tool holder or collet and may be replaced without simultaneous removal of the actuator. This replaceable arrangement ensures that especially the particularly wear-sensitive parts, such as the installation spindle and the entraining blade, can be removed or replaced without having to replace the complete tool. This has a positive effect on the maintenance costs of the present tool. Such a replacement maintains the construction and arrangement of the actuator so that only the parts interacting with the wire thread insert need to be replaced.

The present disclosure further includes the entraining blade for the tool for installing or removing wire thread inserts, which comprises the following features: an elongated base body having a first and a second end, wherein an engaging end is provided at the first end and a first and a second spring strut arranged in a V-shape are provided at the second end.

The first and the second spring strut may each comprise a lateral projection at their ends which allows the entraining blade to move within the tool. The lateral projection of the V-shaped spring struts serves to interact with the design features of the installation spindle as already discussed above. In particular, the one lateral projection serves to hold the entraining blade in the radial opening of the installation spindle in order to prevent the entraining blade from being released from the axial recess. In this way, this lateral projection forms an axial undercut against the installation direction of a wire thread insert. The further lateral projection, which is arranged on the spring strut of the entraining blade, which is arranged further radially inwards, may interact with the backward slider of the actuator. While the backward slider may move into the axial recess of the installation spindle, i.e. in the direction of the driving section, the backward slider engages the second lateral projection and in this way moves the entraining blade together with the actuator in the direction of the driving section of the tool. In this way, at least the engaging end of the entraining blade is moved back into a rest position or released from the engagement with a wire thread insert.

It further may be preferred that the base body of the entraining blade has a curvilinear outer contour adjacent to the spring struts, which serves as an abutment face for moving the entraining blade.

The present disclosure further comprises a manufacturing method for the tool for installing or removing a wire thread insert. This manufacturing method comprises the following steps: manufacturing a spindle body with a driving section and a receiving section with a thread or a threadless surface, creating an axial recess within the entire spindle body, preferably with a one-sided radial window, manufacturing an elongated actuator and arranging the actuator in the axial recess, manufacturing an entraining blade having an elongated base body with a first and a second end, wherein an engaging end is provided at the first end and a first and a second spring strut arranged in a V-shape are provided at the second end, and manually releasably connecting the entraining blade via a fastening connection within the axial recess.

According to another embodiment of the manufacturing method, a radial opening is created in the spindle body, via which the entraining blade can be released manually and in which the entraining blade is held releasably. According to another embodiment of the manufacturing method, a fastening of the actuator in the recess is performed using a blocking means guided in a slot of the actuator, so that the axial movement of the actuator is limited. It is additionally preferred within the manufacturing method to arrange a tool holder or a collet with a sleeve nut in the driving section of the spindle body.

Furthermore, the present disclosure comprises a method for replacing the entraining blade in the tool for installing or removing a wire thread insert. For this, the tool comprises the following features: a spindle body having a driving section via which the spindle body can be rotated about a longitudinal axis, a receiving section arranged at the end and facing away from the driving section, in which a thread for screwing on or a threadless surface for plugging the wire thread insert onto the receiving section is provided, and an axial recess extending over a length within the spindle body, an entraining blade, with an engaging end which is arranged at least axially displaceable in the axial recess at least in the portion of the receiving section, and an elongated actuator which is arranged movably in the longitudinal direction within the axial recess so that the engaging end of the entraining blade can be displaced via the actuator between a first position within the spindle body and a second position outside the spindle body. The procedure for replacing the entraining blade comprises the following steps: releasing a spring strut of the entraining blade from a radial opening of the spindle body, pulling the entraining blade out of the axial recess and manually inserting and fastening another entraining blade in the axial recess of the receiving section, where the first spring strut of the entraining blade latches into the radial opening.

The tool and also its embodiments may have the advantage that the entraining blade is only fastened resiliently and form-fittingly within the axial recess of the installation spindle. This provides the possibility of removing the entraining blade from the spindle without the use of automatic tools or manual tools. It is only necessary to release the holding connection between the one spring strut of the entraining blade and the radial opening of the installation spindle by means of an installation pin in order to be able to manually pull the entraining blade out of the axial recess on the front side of the installation spindle at the receiving section. This process is therefore regarded as a tool-free process because the deinstallation pin used does not require any significant force to be applied to the entraining blade or fastening means to be released using special drive means or the like. This is because the deinstallation pin only serves to release a resiliently produced undercut and thus an effective holding connection between a spring strut of the entraining blade and an edge of the radial opening of the installation pin. Since this deinstallation pin has to apply negligibly small forces compared to the entraining blade, it can be realized for example by means of a match, a plastic pin or a similar construction that cannot be considered a tool.

The present disclosure further includes a method for replacing a spindle body in a tool for installing or removing a wire thread insert, which comprises the followings features: the spindle body having a driving section via which the spindle body can be rotated about a longitudinal axis and which is not integrally connected to a tool holder or a collet, a receiving section arranged at the end and facing away from the driving section, in which a thread for screwing on or a threadless surface for plugging the wire thread insert onto the receiving section is provided, and having an axial recess which extends over a length within the spindle body, an entraining blade having an engaging end which is arranged at least axially displaceable in the axial recess at least in the portion of the receiving section, and an elongated actuator which is movably arranged longitudinally within the axial recess such that the engaging end of the entraining blade can be displaced via the actuator between a first position within the spindle body and a second position outside the spindle body, wherein the method comprises the following steps: removing the entraining blade from the axial recess of the spindle body, releasing the tool holder or collet which holds the spindle body rotationally fixed to the driving section, and removing the spindle body from the tool, preferably without having to deinstall the actuator of the tool, and inserting and fastening a new spindle body in the tool holder or collet.

Compared to known installation tools, the spindle body is not integrally formed with the tool holder. While the spindle body is firmly connected to a tool holder or collet or other coupling to a rotary drive, this connection is limited to an easily releasable portion in the driving section. This connection provides a torsion-proof connection and may be a frictional connection to the spindle body. Independent of the actuator arranged in a centrally movable manner, the spindle body can be released from the connection, removed accordingly and replaced by a new spindle body. Thus, while the rest of the tool remains, the spindle body is replaceable. In this way, wear on the spindle body can be eliminated without having to replace the complete tool or disassemble it with great effort. For the spindle body is held by a combined form-frictional connection in which the driving section is frictionally clamped onto a pin or projection after the axial groove has been plugged on.

The present disclosure also includes an installation method for a wire thread insert in a thread opening by means of the tool described above in one of the various preferred embodiments. This installation method comprises the following steps: arranging the wire thread insert in the receiving section of the spindle body, screwing in the wire thread insert by rotating the spindle body into the thread opening in an installation direction, displacing the actuator within the spindle body in the installation direction and moving an engaging end of the entraining blade in the second position outside the spindle body, displacing the installation tang from a starting position radially outwards and unscrewing or pulling the spindle body out of the wire thread insert. Alternatively, it also may be preferred to use the following installation method: arranging the wire thread insert in the receiving section of the spindle body, displacing the actuator within the spindle body in the installation direction and moving an engaging end of the entraining blade into engagement with the wire thread insert, screwing in the wire thread insert by rotating the spindle body into the thread opening in an installation direction, unscrewing or pulling the spindle body out of the wire thread insert. In combination with both installation methods, an axial displacement of the actuator against the installation direction and releasing the engaging end of the entraining blade from the engagement with the wire thread insert may be preferred.

4. BRIEF DESCRIPTION OF THE ACCOMPANYING DRAWINGS

Figure 2:
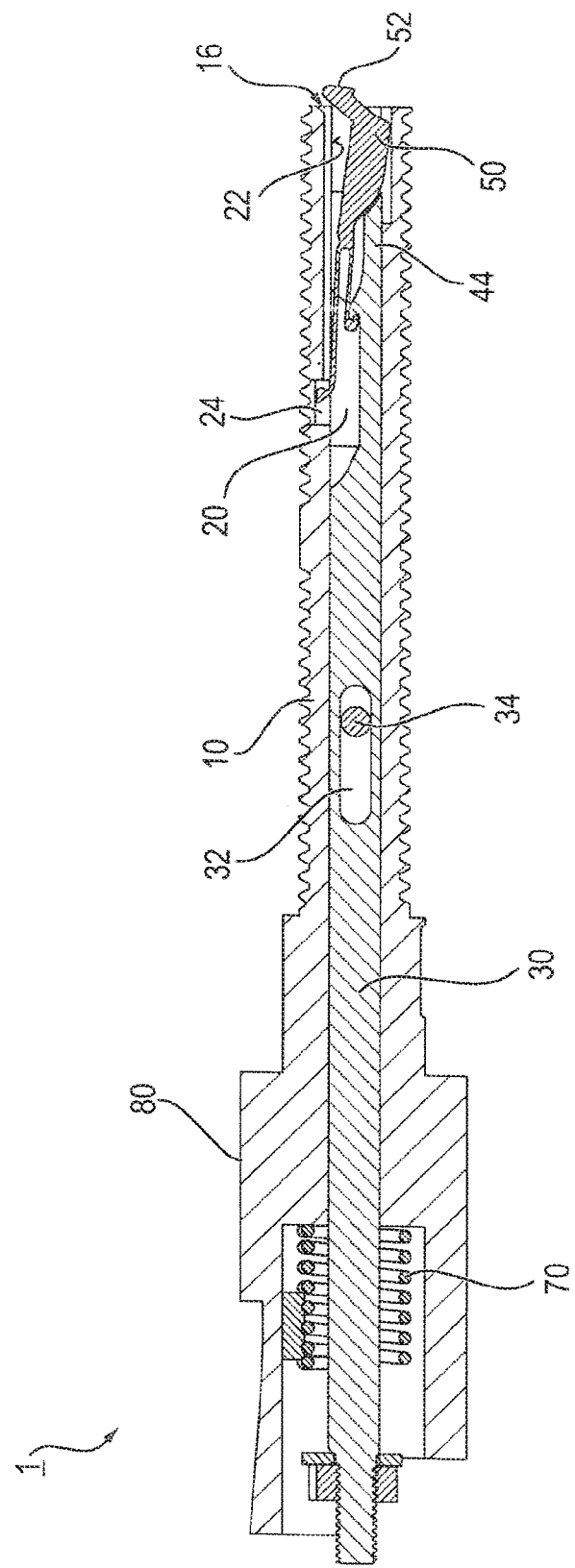
Figure 3:
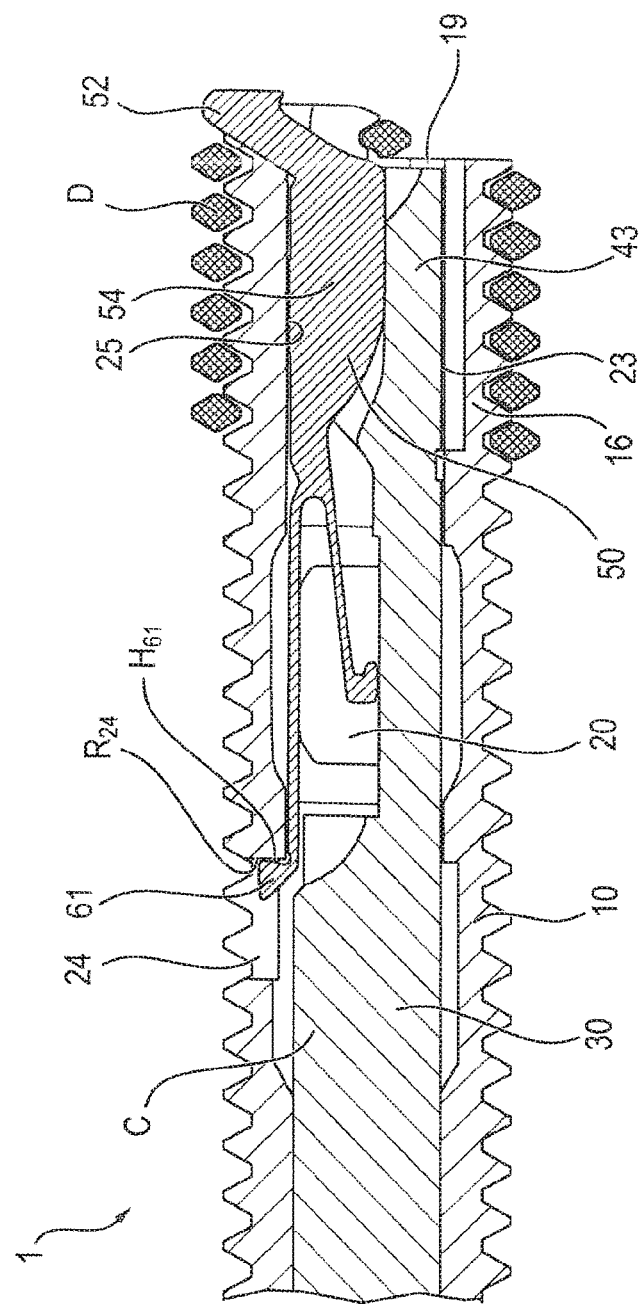
Figure 4:
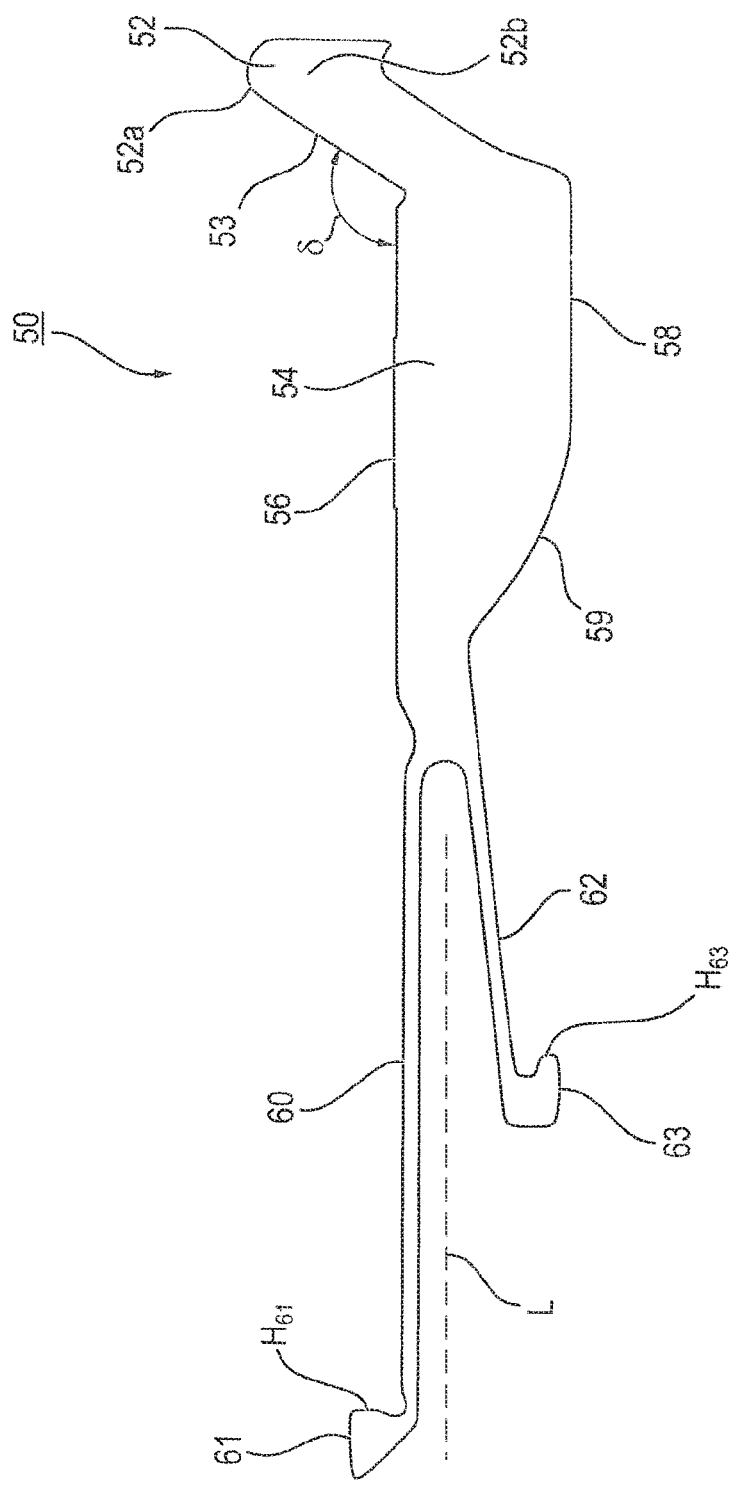
Figure 7:
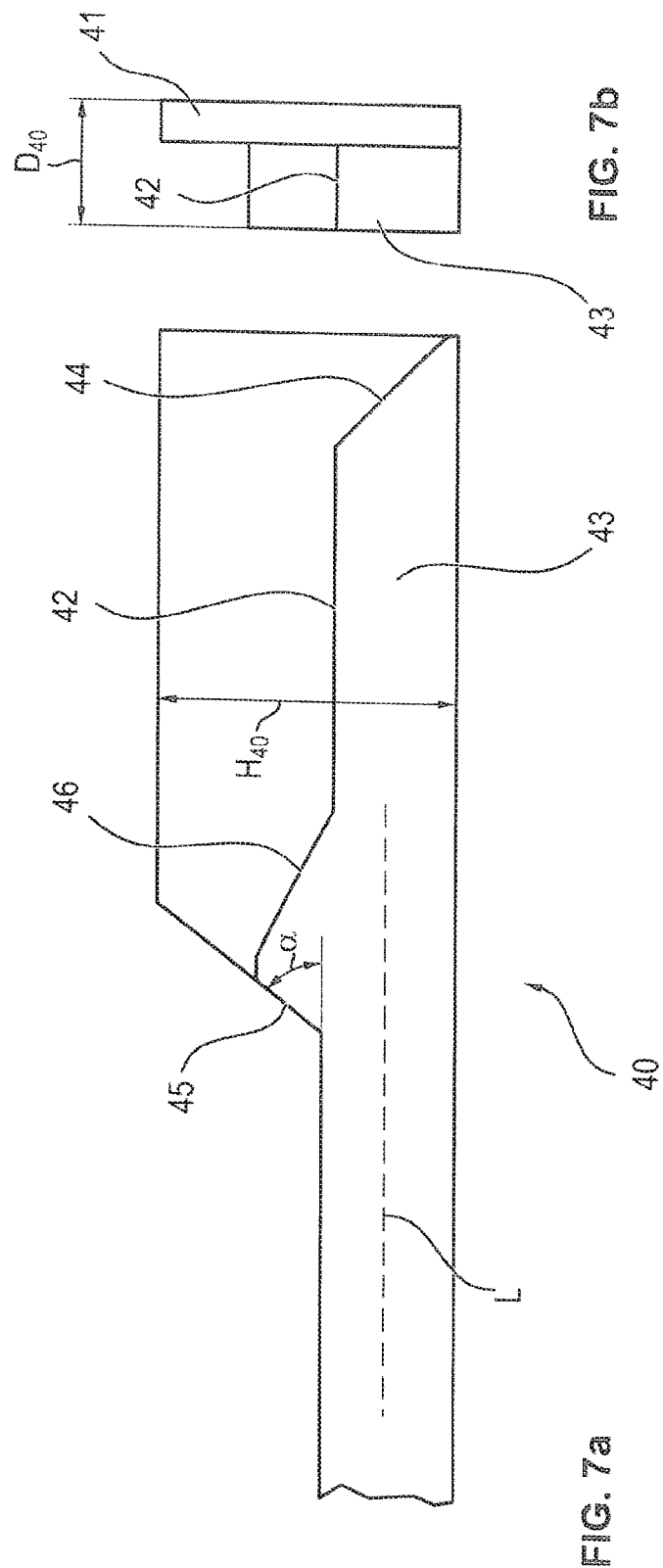
Figure 8:
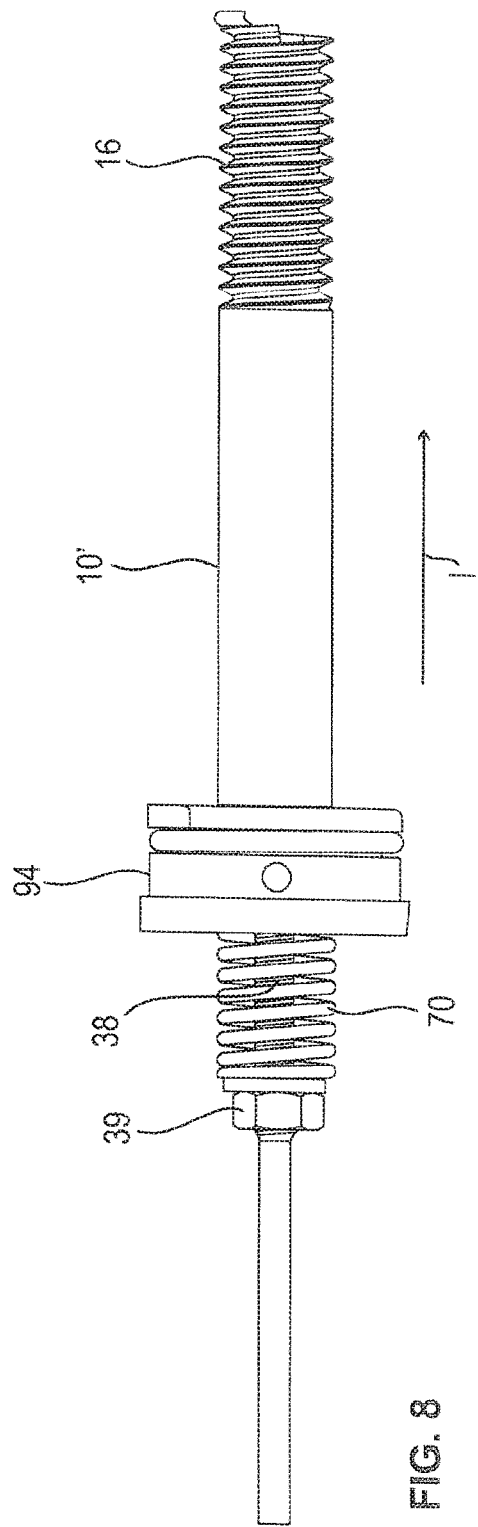
Figure 9:
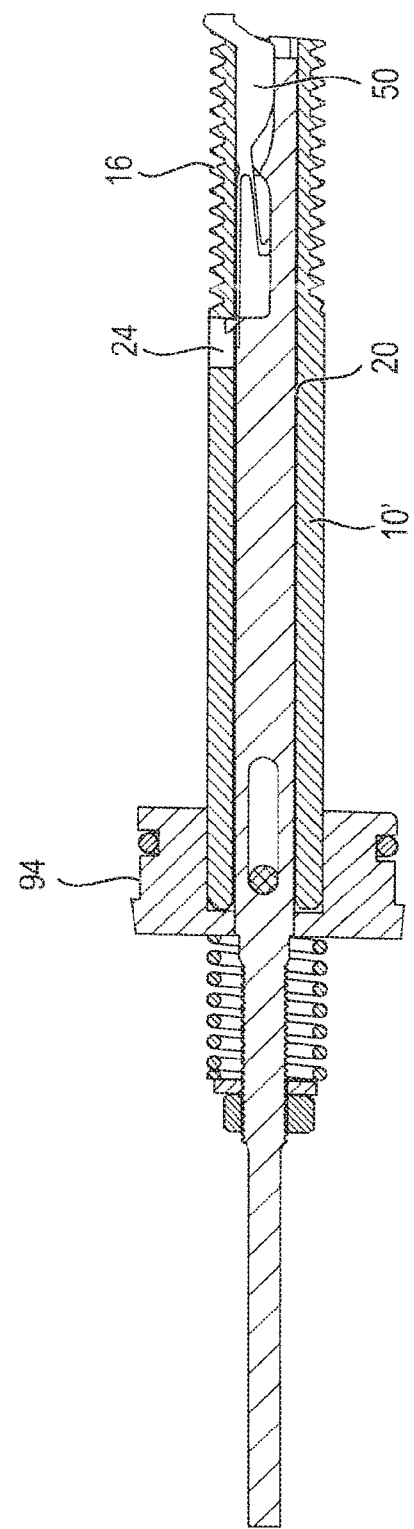
Figure 10:
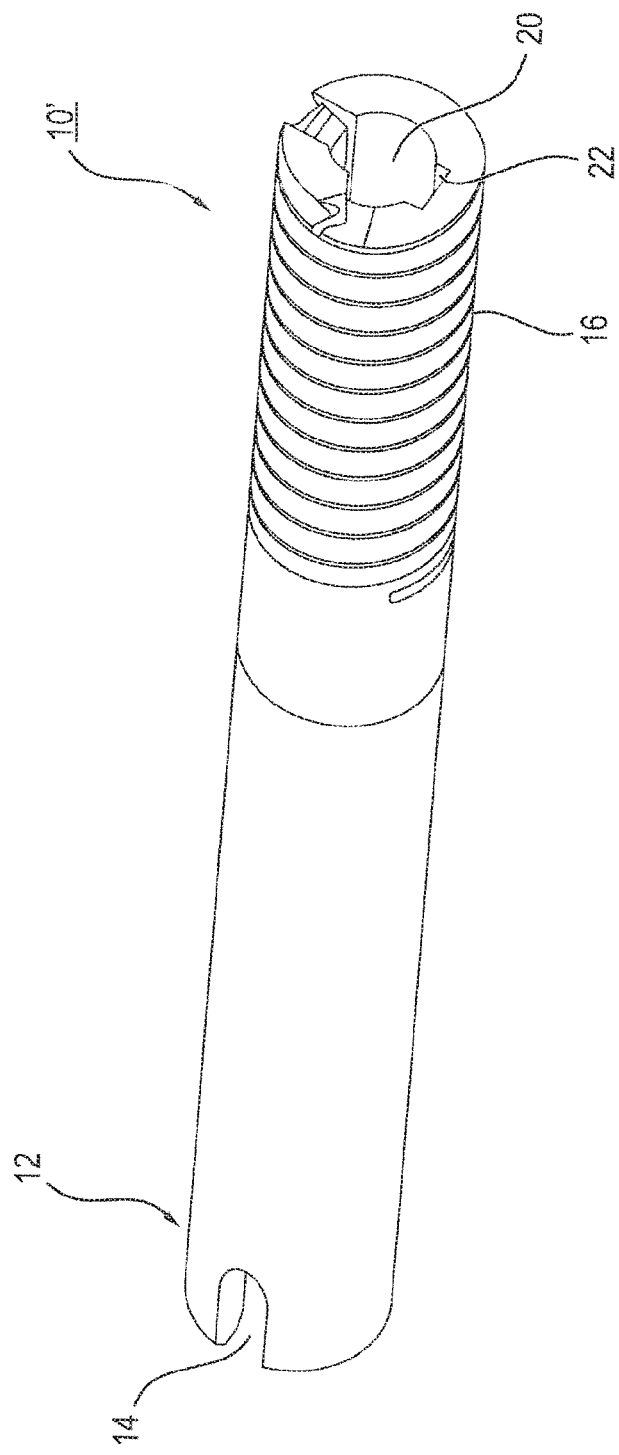
Figure 11:
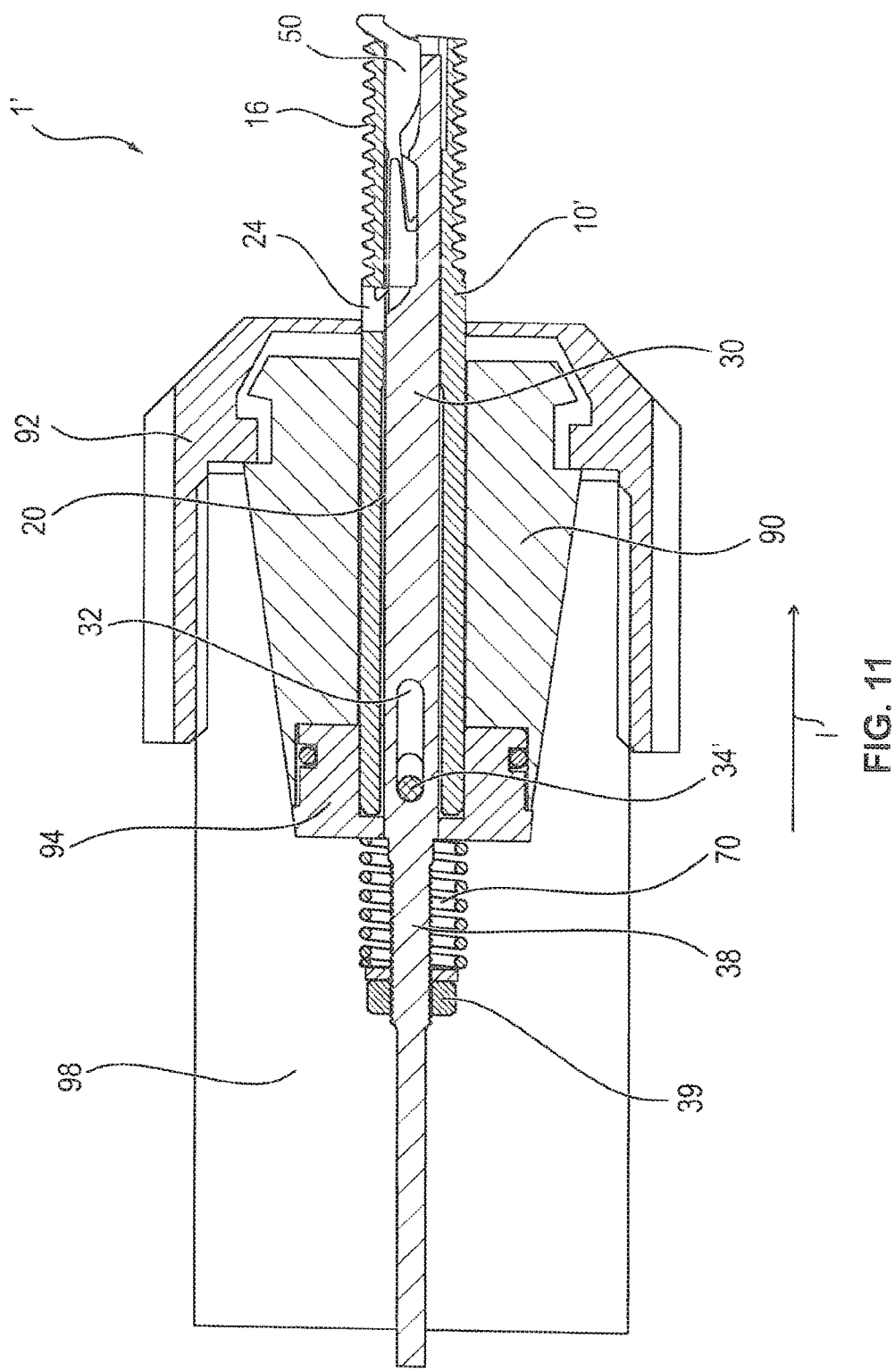
Figure 12:
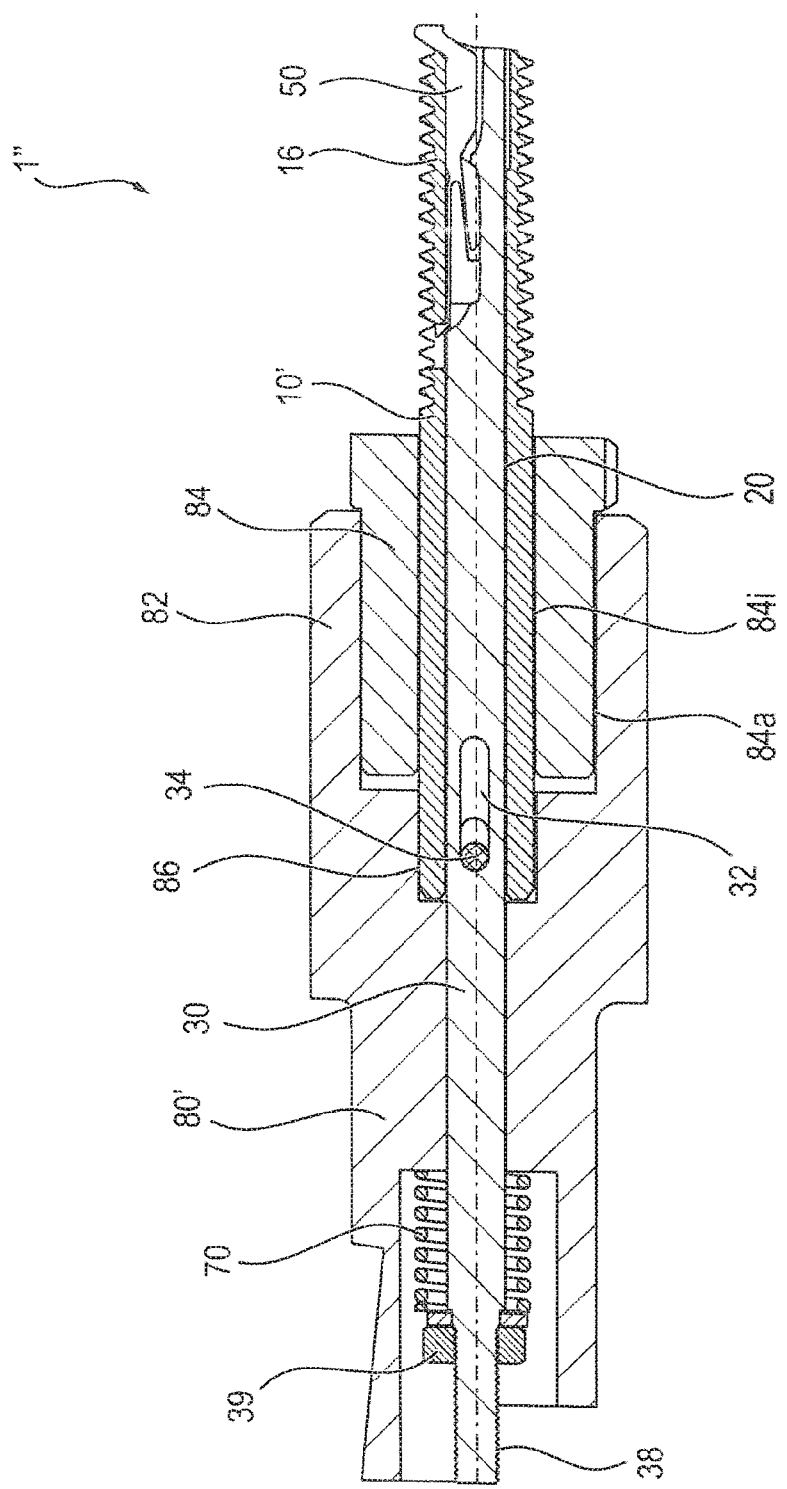
Figure 13:
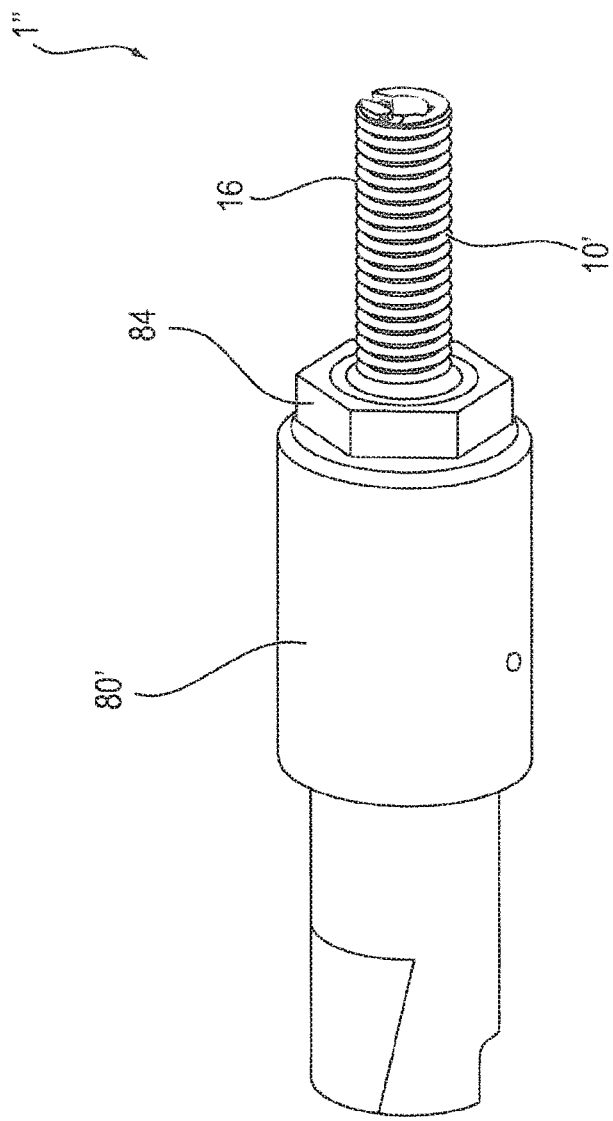

Some embodiments of the present disclosure are explained in more detail with reference to the accompanying drawings. Showing:

FIG. 1 is a perspective view of an embodiment of the tool,

FIG. 2 is a sectional view of the tool according to FIG. 1 in which a tool holder is integrally connected to the spindle body, FIG. 3 is an enlarged view of the receiving section of the tool of FIG. 2 with the wire thread insert screwed on, FIG. 4 is a lateral view of an embodiment of the entraining blade of the tool of FIG. 2, FIG. 5 is a lateral view in combination with an axial sectional view of the tool of FIG. 1 without actuator and entraining blade, FIG. 6 is a lateral view of an embodiment of the actuator of the tool of FIG. 1, FIG. 7a shows an enlarged view of the quadrangularly delimited area of FIG. 5 and FIG. 7b shows a front-sided front view of the actuator according to the enlarged view in FIG. 7a, FIG. 8 is a further embodiment of the tool of FIG. 11 in a laterally reduced representation, FIG. 9 is a sectional view of the tool of FIG. 8, FIG. 10 is a perspective view of an embodiment of the spindle body of the tool according to FIGS. 8 and 12, FIG. 11 is a lateral view of the tool according to FIG. 8 with collet and sleeve nut, FIG. 12 is a further embodiment of the tool in a lateral sectional view, FIG. 13 is a perspective representation of the tool of FIG. 12, FIG. 14 is a flow chart of an embodiment of the manufacturing method of the tool, FIG. 15 is a flowchart of an embodiment of a method for replacing an entraining blade in the tool; and FIG. 16 is a flow chart of an embodiment of a method for installing a wire thread insert.

5. DETAILED DESCRIPTION

The tool 1; 1'; 1" is shown as an example in FIGS. 1, 11 and 12 in various embodiments. It is characterized by an entraining blade 50 which can be extended from a spindle body 10. By means of this movability, an engaging end 52 of the entraining blade 50 is engaged or released from an engagement with a wire thread insert D. This mechanical operative connection between the entraining blade 10 and the wire thread insert D ensures a transmission of a rotary movement from the tool 1; 1'; 1" to the wire thread insert D. This makes the tool 1; 1'; 1" suitable for installing a wire thread insert D in a thread opening of a component in the same way as for removing a wire thread insert D from a thread opening. Accordingly, tool 1; 1'; 1" constitutes an installation tool and/or an deinstallation tool for wire thread inserts, which preferably establishes a positive-locking operative connection to the wire thread insert D.

The spindle body 10; 10' comprises a driving section 12; 12' to rotate the spindle body 10; 10' about its longitudinal axis L. For this, the driving section 12; 12' comprises at least one positive-locking or form-fit, preferably a combined positive-locking or form-fit and non-positive or force-fit connection between the spindle body 10; 10' and a tool holder 80 (see FIGS. 12 and 13), a chuck 90 with a sleeve nut 92 (see FIGS. 8 to 11) or an integral spindle body with a tool holder 80 according to FIGS. 1, 2, 5.

The driving section 12 comprises an axial groove 14 at its front-side end of the spindle body 10; 10'. The axial groove 14 forms a positive connection with a pin engaging in the axial groove 14 or with a radial projection. This positive connection constitutes a torque-proof coupling between the spindle body 10; 10' and the tool holder 80 or the collet 90 or generally with a drive component (not shown). Thus the rotary movement of the tool holder 80, the collet 90 or the drive component can be transferred to the spindle body 10; 10'. Preferably the axial groove 14 also serves as a positioning aid for the spindle body 10; 10' in the tool holder 80 or the collet 90 or generally in the drive component. As soon as the spindle body 10; 10' is inserted in a holder 17 of the tool holder 80 or the collet 90 or generally the drive component, said pin or radial projection preferably ensures a concentric clamping of the spindle body 10; 10' with respect to the tool holder and the drive of the spindle body 10; 10'.

In addition, the driving section 12 may provide a fastening portion 14 on the front side or end face, so that the spindle body 10; 10' can be releasably fastened in the tool holder 80 or the collet 90 or generally in the drive component. The attachment of the spindle body 10; 10' can be realized regardless of an axial length of the spindle body 10, 10'. Therefore, the spindle bodies 10; 10' of different lengths can be fastened in a rotationally fixed manner, adapted to the respective application situation, while at the same time being releasable and thus easily replaceable. This releasability does not apply to a spindle body 10; 10' which is formed integrally with the tool holder 80. This replaceability is advantageous as a receiving section 16 of the spindle body 10; 10' is worn or damaged by the number of installation or deinstallation operations, making it necessary to replace the spindle body 10; 10'. Therefore it is not necessary to replace the entire tool 1; 1', instead only the spindle body 10; 10' has to be replaced.

Opposite the driving section 12, the receiving section 16 is provided at the second axial end of the spindle body 10; 10'. The receiving section 16 comprises a thread 18. Here, a wire thread insert is spindled and unspindled during an installation or deinstallation procedure. According to a further preferred embodiment, the receiving section 16 comprises a threadless face (not shown) for plugging on a wire thread insert. After plugging the wire thread insert onto the receiving section 16 during the installation or deinstallation procedure, a positive fit or form-fit with the entraining blade 50 then ensures the installation and/or deinstallation of the wire thread insert by rotating the spindle body 10; 10'.

In addition, the receiving section 16 may have a front face opening 19, through which an engaging end 52 of the entraining blade 50 can be moved outwards in an installation direction I for wire thread inserts and back. The opening 19 is surrounded by an annular face of the spindle body 10; 10', which preferably comprises at least one latching shoulder and/or at least one latching groove for holding an installation tang of a wire thread insert.

According to a further embodiment of the receiving section 16, a radial window is provided. This radial window enables a selective extending of the engaging end 52 of the entraining blade 52 radially outwards from the spindle body 10; 10', in order to be able to engage in a notch of a wire thread insert. The different design forms of the receiving section 16 are described in DE 10 2010 050 735 A1 and DE 10 2011 051 846 A1, which are hereby incorporated by reference.

In its interior, the spindle body 10; 10' comprises an axial recess 20. The axial recess 20 extends over the entire length of the spindle body 10; 10', so that an elongated actuator 30 and the entraining blade 50 can be arranged within the recess 20.

In order to provide support and/or guide faces for the actuator 30 and/or the entraining blade 50 within the axial recess, the inner shape of the recess 20 may be adapted to the outer shape of the actuator 30 and/or the entraining blade 50. If, for example, the actuator 30 comprises a rectangular cross-section, then guide grooves and/or radial stopping faces 22 are provided for the actuator 30 on an inner face of the axial recess 20 at least over axial sub-portions. Radial stopping face indicates that the face is situated in a radial plane or adjacent to a radial plane.

In a further embodiment of the recess 20, at least one first radial groove is provided in the receiving section 16, which is partly formed by the stopping face 22. The radial groove supports and positions the entraining blade 50, which is explained in more detail below.

In addition to or as an alternative to the guide grooves and/or stopping faces 22, the actuator 20 is aligned in the axial recess 20, guided in its movement as well as limited in its movement via a pin-slot-connection 32, 34. For this purpose, the actuator 30 may comprise an elongated hole or slot 32 which extends parallel to the longitudinal axis of the actuator 30. A pin 34 or a similar locking means, such as a radial projection in the recess 20, may extend through or penetrates this slot 32. The pin 34 may be releasably fastened in respective openings 35 of the spindle body 10; 10', e.g. is riveted, glued, pressed in, screwed in. Due to the pin-slot-connection, the axial freedom of motion of the actuator 30 is limited and adapted to the necessary actuation path for the entraining blade 50. In addition, the pin-slot-connection 32, 34 produces a position orientation of the actuator 30 in the recess 20.

By a quadrangularly delimited area B, FIG. 5 emphasizes a section in the recess 20, in which the axial movement of the actuator 30 causes different adjusting movements of the entraining blade 50. In addition, in FIG. 6 area B is only shown in combination with the actuator 30 and in FIG. 7a an enlarged representation of an adjusting or actuating end portion 40 of the actuator 30 is shown. In addition, FIG. 7b shows an end face top view of the end face of the actuator 30, which is arranged adjacent to the opening 19 of the spindle body 10.

As can be seen from FIGS. 2-4 and 7, the geometric designs of the entraining blade 50 and the actuator 30 are adapted to each other in the actuating end portion 40. In general, the entraining blade 50 has an elongated base body 54 as shown in FIG. 4. At a first end the engaging end 52 is provided. Depending on the construction of the wire thread insert to be installed and/or deinstalled (see above), the engaging end 52 protrudes in the radial and/or axial direction from the base body 4. It is also preferred that the engaging end 52 protrudes inclined at an angle δ relative to the base body 54. Depending on the shape of the engaging end 52, it provides an engaging tip 52a and/or an upsetting surface 52b.

The base body 54 may have a first supporting edge 56 extending in a straight line and parallel to a longitudinal axis of the entraining blade 50, which is arranged adjacent to the engaging end 52. The supporting edge 56 may engage in an axial groove 14 of the recess 20 or on a radially arranged stopping face 22. A second supporting edge 58 arranged opposite to the first supporting edge 56 may be held and supported by a stepped abutment face 42 of the actuator 30. For this purpose, the actuator 30 is formed in a stepped manner at least in the end portion 40, if the cross-section of the actuator 30 or the front face top view of the actuator 30 according to FIG. 7a is viewed. With respect to a thickness $D_{40}$ of the actuator 30 in the actuating portion 40 transverse to the longitudinal axis of the actuator 30, a first subportion 41 thereof extends over the entire height $H_{40}$ of the actuator 30. The entire height $H_{40}$ is adapted to the extension of the recess 20, so that the actuator 30 is preferably in contact with and can be guided in the recess 20. A second subportion 43 extends over only a fraction of the height $H_{40}$. The subportion 43 extends in the axial direction of the actuator 30 over different heights transverse to the longitudinal axis of the actuator 30. The subportion 43 is limited radially inwards by the abutment face 42. Since the supporting edge 58 of the entraining blade 50 rests on the stepped-shaped abutment face 42 and the entraining blade 50 is guided through the subportion 41, the entraining blade 50 is arranged reliably in the recess.

The supporting edge 58 extends in the longitudinal direction L of the entraining blade 50 facing away from the engaging end 52 in a curvilinear direction. As a result, the base body 54 may be tapered, since the supporting edge 58 extends curvilinearly, preferably curved, in the portion 59 towards the supporting edge 56.

Opposite to the engaging end 52 the base body 54 transitions into a first 60 and a second spring strut 62. These may enclose an acute angle and thus are arranged V-shaped to each other. The spring strut 60 may be arranged on the same longitudinal side of the entraining blade 50 as the engaging end 52. According to a further embodiment, it comprises a lateral projection 61 which extends parallel to the height $H_{40}$. The lateral projection 61 forms an undercut $H_{61}$ in the axial direction of the entraining blade 50 and the spindle body 10; 10'. The lateral projection 61 preferably engages in a radial window 24 of the spindle body 10; 10'. The undercut $H_{61}$ prevents an axial displacement of the entraining blade 50 out of the opening 19 by forming a positive connection with an edge portion R24 of the radial window 24. This is especially necessary when the actuator 30 is moved in the direction of the opening 19 of the spindle body 10; 10' in order to extend the engaging end 52 out of the spindle body 10; 10'.

During the aforementioned extension movement of the engaging end 52, a subportion C of the actuator 30 extending over the height $H_{40}$ is moved laterally next to the lateral projection 61. Thereby the actuator 30 with the portion C blocks the projection 61 against a movement radially inwards with respect to the spindle body 10; 10'. This prevents the projection 61 from being released from the radial window 24, so that the entraining blade 50 is held reliably in the recess 50.

As soon as the projection 61 from the radial window 24 is released radially inwards from the engagement with the radial window 24 manually or by means of an assembly lever or assembly pin M, the entraining blade 50 can be removed from the recess 20. This is possible in a starting position of the actuator 30 shown in FIG. 2. In the starting position, the actuator 30 is located within the recess 20, displaced in the direction of the driving section 12. In this position the spring strut 60 can be moved radially inwards, since the actuator 30 with a tapered portion 36 is arranged adjacent to the projection 61. If the projection 61 has been released from the radial window 24, the actuator 30 is moved axially in the direction of the opening 19. In this movement, a forward slider 44 engages as an inclined subportion of the abutment face 42 in the portion 59 of the entraining blade 50 and displaces the entraining blade 50 in the direction of the opening 19. For this, the inclinations of the portion 59 and of the forward slider 54 are preferably adapted to each other in such a manner that an effective force and movement transmission from the actuator 30 to the entraining blade 50 takes place. As soon as the engaging end 52 protrudes axially from the opening 19, it can be gripped or held manually or with a tool.

The entraining blade 50 is also held by a lateral projection 63 on the spring strut 62, which extends in the opposite direction as compared to the projection 61. The lateral projection 63 also forms an undercut $H_{63}$ which interacts with a backstop 45 of the actuator 30. The backstop 45 may constitute an inclined plane which is inclined at an angle α to the longitudinal axis of the actuator in the range of $30°≤α≤135°$, preferably in a range of $45°≤α≤90°$ and further preferably at an angle α of 78° to the longitudinal axis L of the actuator 30.

Regardless of the blocking of the projection 63 by the backstop 45, starting from a threshold tensile force on the entraining blade 50, the projection 63 slides axially in the direction of the opening 19 past the backstop 45. This tensile force is preferably applied via the engaging end 52. The tensile force causes the spring strut 62 to move radially inwards past the projection 63 and the backstop 45 and to overcome the backstop 45. Then the entraining blade 50 can be completely removed from the recess 20.

In order to insert the entraining blade 50 into the spindle body 10; 10', first the spreading of the spring struts 60, 62 is reduced so that the spring struts 60, 62 can be inserted into the opening 19. In addition, the actuator 30 is preferably moved to the maximum in the direction of the opening 19. When the entraining blade 50 is inserted into the opening 19, the spring struts 60, 62 first slide over an extension slope or inclination 46. The extension slope 46 is a partial face of the abutment face 42 which is arranged inclined in the direction of the driving section 12. It forms the back side of the backstop 45, as shown in FIG. 7.

As soon as the spring struts 60, 62 of the entraining blade 50 have overcome the extension slope 56 by axial pressure on the drive end 52, they spring back to their starting position. Thereby the spring strut 60 preferably rests against the radial inner side 25 of the recess 20. The spring strut 62 springs into a portion D which shows only a fraction of the height $H_{40}$ of the actuator 30. The actuator 30 is moved so far with the entraining blade 50 in the direction of the driving section 12 until the projection 61 snaps into the radial window 24. If the actuator 30 is moved further in the direction of the driving section 12, the backstop 45 engages the projection 63 and guides the entraining blade 50 further into the axial recess 20. This state is shown in FIG. 2. The engaging end 52 of the entraining blade 50 is preferably arranged in an inclined manner at an obtuse angle δ to the longitudinal axis L of the entraining blade. An inclined sliding face 52 arranged at the engaging end 52 therefore may slide along the edge of the opening 19 of the spindle body 10; 10' when moving the entraining blade 50.

During the movement of the actuator 30 in the direction of the opening 19, the forward slider 44 moves the entraining blade 50 in the direction of the opening 19. For this purpose, the forward slider 44 supports itself in the portion 59. As soon as the projection 61 is blocked in the radial window 24, the portion 59 of the entraining blade slides onto the abutment face 42, so that the supporting edge 58 of the entraining blade is supported on the abutment face 42. Thereby, the engaging end 52 is displaced radially outwards until the subportion 43 is completely slid between the base body 54 and the radial inner wall 23 of the recess 20. In this installation position, the entraining blade 50 is held in a stable manner between the abutment face 42 of the actuator 30 and the radial inner wall 23 of the recess 20. In addition to the support by the radial inner wall 25 and the abutment face 42, the radial stopping faces 22 (see FIG. 10) without the corresponding radial grooves in the recess 20 stabilize the position of the entraining blade 50.

As already mentioned above, different constructions of the installation tool 1; 1' may be preferred. In all embodiments, the actuator 30 described above is used, which is spring-pretensioned against the installation direction I via the spring 70. For this purpose, the spring 70 supports itself at a fixed axial point on the installation tool 1; 1' in such a manner that the actuator 30 is drawn into the spindle body 10; 10' by the force of the spring 70. The axial retraction movement of the actuator 30 caused by the spring 70 is limited in its path by the connection between the slot 32 and the pin 34 (see FIGS. 2 and 11).

To pretension the spring 70 against the stop, the actuator 30 comprises a threaded end 38 with an adjusting nut 39. By axially displacing the adjusting nut 39 on the threaded end 38, the spring 70 is compressed between the adjusting nut 38 and the stop and the actuator 30 is thus pretensioned against the installation direction I.

In the installation tool 1 of FIG. 1, the spindle body 10 may be integrally connected with the tool holder 80. The spindle body 10 with the tool holder 80 is manufactured according to an embodiment by means of spark erosion.

In a further embodiment of the installation tool 1" as shown in FIG. 12, the tool holder 80' is constructed in a sleeve-like manner in the direction of the spindle body 10'. While the spindle body 10' comprises the driving section 12 described above (see FIG. 10), it is releasably fastened inside the sleeve-like end 82 of the tool holder 80' by a hollow cylindrical clamping sleeve 84. The clamping sleeve 84 is fastened in the sleeve-like end 82 via a radial external thread and thus frictionally fastens the spindle body 10' to the radial inner side 84. Thereby, the spindle body 10' can be replaced selectively with little effort. A replacing of the spindle body 10' takes place when the spindle body 10' is worn out or when the components to be connected to each other require spindle bodies 10' of different lengths. In addition, the entraining blade 50 with the characteristics described above is also replaceable, while the rest of the tool 1" is preserved. It is therefore not necessary to replace the actuator 30 with the spring 70.

In order to align the replaceable spindle body 10' concentrically with the actuator 30 and to hold it in its position in the tool 1' in a rotation-proof manner, an axial groove 14 is provided on the driving section 12 of the spindle body 10 (see FIG. 10). Since the spindle body 10; 10' is formed hollow-cylindrically in the driving section 12 in order to ensure the arrangement of the actuator 30, at least one axial groove 14 must be provided. For reasons of stability, two axial grooves 14 arranged opposite to one another or more than two axial grooves 14 are advantageous. At least one radial projection provided in a receiving section 86 of the sleeve-like end 82 engages in the at least one axial groove 14. The receiving section 86 is adapted in its diameter to the diameter of the driving section 12 of the spindle body 10'; 10".

According to a further embodiment of the tool 1', the spindle body 10' is held in a collet 90 with a sleeve nut 92. The collet 90 comprises a releasable disc element 94, which serves as a stop for the spring 70, as a receiving section 96 for the driving section 12 of the spindle body 10' and as a positioning aid in the collet 90. In the receiving section 96, preferably the pin 34' is provided, which guides the actuator 30 by means of the slot 32. The pin 34' may also be used to align the spindle body 10' when the axial groove 14 is plugged onto the pin 34. To hold the spindle body 10' in the disc element 94, the disc element 94 is compressed in radial direction by the collet 90 and the sleeve nut 92. The tool 1' with the collet 90 is arranged and fastened in a hollow shaft 98. Accordingly, the spindle body 10' can also be easily replaced here.

This replacement procedure of the spindle body can be summarized as follows. Removing the entraining blade from the axial recess of the spindle body, releasing the tool holder or collet that holds the spindle body torque-proof or rotation-proof on the driving section, and removing the spindle body from the tool, preferably without having to deinstall the actuator of the tool, and inserting and fastening a new spindle body in the tool holder or collet.

The manufacturing method for the above-described embodiments of the tool 1; 1'; 1" can be summarized by the following steps. First, in a first step S1, the spindle body 10; 10'; 10" is manufactured with the driving section 12 and the receiving section 16. At this, in a second step S2, the axial recess 20 is created within the spindle body 10; 10'; 10". In a third step S3 the actuator 30 is manufactured and in step S4 it is arranged within the axial recess 20. Parallel to or following the above-mentioned steps, the entraining blade is produced in step S5, preferably by means of spark erosion. Finally, the entraining blade 50 is arranged manually releasably within the axial recess 20 (step S6).

In order to be able to manufacture the above described embodiments of tool 1; 1'; 1", further the radial opening 24 in the spindle body 10; 10' is created. Via this opening 24, also referred to as radial window 24, the entraining blade 50 can be released manually. In a further step, it may be preferred to fasten the actuator 30 by means the pin 34; 34' guided in the slot 32 (step S7). According to at least some embodiments of the present manufacturing method, the spindle body 10 is manufactured as an integral part in combination with the tool holder. As an alternative to this, it is preferred to provide the tool holder 80' separately from the spindle body 10; 10' and then to connect it to the spindle body 10; 10' in the driving section 12 of the spindle body 10; 10'. According to a further preferred alternative, the spindle body 10; 10' is arranged and held in a collet 90 with a sleeve nut 92.

The procedure described above for replacing the entraining blade 50 in the various preferred embodiments of the tool 1; 1'; 1" can be summarized in the following steps. In step A1, a manual release of the spring strut 60 of the entraining blade 50 from the radial opening or the radial window 24 of the spindle body 10; 10'; 10" first takes place. This is because the lateral projection 61 retains the entraining blade 50 within the radial window 24 due to the radially outward spring tension of the spring strut 60. For the preferred manual release of the spring strut 60, the lateral projection 61 is displaced radially inwards into the spindle body 10; 10'; 10". This releasing may be performed by means of an installation pin or, if the radial window 24 is designed accordingly, purely manually without a tool.

Subsequently, in step A2, the entraining blade 50 may be pulled out manually from the axial recess 20. After the entraining blade 50 has been removed from the axial recess 20, a manual inserting and fastening of a different entraining blade 50 takes place in the axial recess 20 (step A3). For this purpose, the two spring struts 60, 62 arranged opposite to each other are pressed towards each other so that they can be inserted into the opening 19 of the spindle body 10; 10'; 10". As soon as the entraining blade 50 has been pushed sufficiently deep into the spindle body and especially into the axial recess 20, the spring strut 60 with its lateral projection 61 snaps automatically into the radial window 24.

To be able to install a wire thread insert D according to DE 10 2010 050 735 A1 in a thread opening of a component, the former is first arranged in the receiving section 16 of the spindle body 10; 10'; 10". This is performed by plugging or screwing onto the receiving section 16 (step I1). Then, by rotating the spindle body 10; 10'; 10" in a first rotational direction, the wire thread insert D is rotated or screwed into the thread opening in the installation direction I. As soon as the wire thread insert D has reached a desired insertion depth in the thread opening, the rotation of the spindle body 10; 10'; 10" is first stopped. The actuator 30 is then displaced in the installation direction I within the spindle body 10; 10'; 10". With this movement of the actuator 30, the engaging end 52 of the entraining blade 50 is brought into the second position outside the spindle body 10; 10'; 10". In this way, the engaging end 52 for the screwed-in wire thread insert D forms the upsetting surface 52*b*, which engages the free end of the wire thread insert D when the spindle body 10; 10'; 10" is rotated back. Accordingly, a rotation of the spindle body 10; 10'; 10" in a second rotational direction, which is opposite to the first rotational direction, now takes place. With this rotational movement, the installation tang of the wire thread insert D is compressed and permanently bent back radially into the receiving thread of the thread opening of the component. As soon as the installation tang has reached its bent back state, the rotation in the second rotational direction is preferably stopped to mechanically relieve the installation tang and the upsetting surface 52*b*. Then the actuator 30 is moved in the direction of the driving section 12 in order to release the engaging end 52 of the entraining blade 50 from the operative connection with the installation tang. It is also preferred to release the engaging end 52 of the entraining blade 50 during the rotation of the spindle body 10; 10'; 10" in the second rotational direction from the operative connection with the installation tang. Finally, the spindle body 10; 10'; 10" is completely rotated or pulled out of the wire thread insert G.

In order to be able to install a wire thread insert D with an radially inwardly arranged entraining notch in a thread opening of a component, the former is initially arranged in the receiving section 16 of the spindle body 10; 10'; 10". This is performed by plugging or screwing onto the receiving section 16 (step I1). Then, the actuator 30 is displaced in the installation direction I within the spindle body 10; 10'; 10". With this movement of the actuator 30, the engaging end 52 of the entraining blade 50 is brought into the second position outside the spindle body 10; 10'; 10". In this way, the entraining blade 50 establishes a positive-locking operative connection with the wire thread insert D. For this, the engaging end 52 of the entraining blade 50 engages in the entraining notch (not shown) of the wire thread insert D. Subsequently, the wire thread insert D is turned or screwed into the thread opening in installation direction I by rotating the spindle body 10; 10'; 10" in a first rotational direction. As soon as the wire thread insert D has reached a desired insertion depth in the thread opening, the rotation of the spindle body 10; 10'; 10" is first stopped. Then the actuator 30 is moved towards the driving section 12 in order to release the engaging end 52 of the entraining blade 50 from the operative connection with the wire thread insert. Now a rotation of the spindle body 10; 10'; 10" in a second rotational direction, which is opposite to the first rotational direction, takes place. With this rotational movement, the spindle body 10; 10'; 10" is completely rotated out of the wire thread insert G. If the wire thread insert D is only plugged onto the engaging end 12, the spindle body 10; 10'; 10" can be pulled out of the wire thread insert D after releasing the operative connection between the entraining blade 50 and the wire thread insert D. It may also be preferred to release the engaging end 52 of the entraining blade 50 from the operative connection with the wire thread insert during the rotation of the spindle body 10; 10'; 10" in the second rotational direction.

The invention claimed is:

1. Tool for installing or removing a wire thread insert which comprises the following features:
   a. a spindle body having
      a1. a driving section, by means of which the spindle body can be rotated about a longitudinal axis,
      a2. a receiving section arranged at the end and facing away from the driving section, in which a thread for screwing on or a threadless surface for plugging on the wire thread insert onto the receiving section is provided, and
      a3. an axial recess, which extends within the spindle body over a length,
   b. an entraining blade with an engaging end, which is arranged at least axially displaceable in the axial recess at least in the portion of the receiving section, and
   c. an elongated actuator which is arranged movably in the longitudinal direction within the axial recess so that the engaging end of the entraining blade can be displaced by means of the actuator between a first position within the spindle body and a second position outside the spindle body.

2. The tool according to claim 1, in which the recess extends over the entire length of the spindle body and the actuator extends within the recess from the driving section up to the receiving section and an axial movement of the actuator within the recess is limited in a positive-locking or form-fit manner.

3. The tool according to claim 2, in which the actuator comprises at an axial end a forward slider for actuating the entraining blade which encloses an angle <90° with a longitudinal axis of the spindle body.

4. The tool according to claim 2, the spindle body of which comprises a radial opening in which the entraining blade is releasably held in the axial direction of the spindle body.

5. The tool according to claim 2 in which the recess comprises, at least in the receiving section, a first radial groove which extends in the axial direction and which supports the entraining blade.

6. The tool according to claim 2, in which the actuator comprises a backward slider for the entraining blade with which the entraining blade can be displaced into the recess by means of the actuator, wherein the backward slider is formed as an abutment face which encloses an obtuse angle with the longitudinal axis.

7. The tool according to claim 2, the entraining blade of which comprises, at an end facing away from the engaging end, a first and a second spring strut arranged in a V-shape, the first spring strut of which ensures an extending of the engaging end and the second spring strut ensures a movement of the entraining blade in the recess.

8. The tool according to claim 2 in which the driving section comprises a tool holder or a collet with a sleeve nut.

9. The tool according to claim 2 in which the entraining blade is replaceable.

10. The tool according to claim 2 in which the spindle body is not integrally connected to a tool holder or a collet and can be replaced without removing the actuator at the same time.

11. The tool according to claim 2 in which the entraining blade is held in a self-acting manner.

12. An entraining blade for a tool for installing or removing wire thread inserts according to claim 1 which comprises the following features:
   an elongated base body having a first and a second end, wherein
      at the first end an engaging end and at the second end a first and a second spring strut arranged in a V-shape are provided.

13. The entraining blade according to claim 12, in which the first and second spring struts each have a lateral projection at the end which allows a movement of the entraining blade in the tool.

14. The entraining blade according to claim 13, the base body of which, adjacent to the spring struts, has a curvilinear outer contour which serves as a contact face for moving the entraining blade.

15. A method for replacing an entraining blade in a tool for installing or removing a wire thread insert according to claim 1, comprising the following features: a spindle body having a driving section, by means of which the spindle body can be rotated about a longitudinal axis, a receiving section arranged at the end and facing away from the driving section, in which receiving section a thread for screwing on or a threadless surface for plugging on the wire thread insert onto the receiving section is provided, and having an axial recess, which extends in the interior of the spindle body over a length, an entraining blade with an engaging end, which is arranged at least axially displaceable in the axial recess at least in the portion of the receiving section, and an elongated actuator which is arranged movably in the longitudinal direction within the axial recess so that the engaging end of the entraining blade can be displaced by means of the actuator between a first position within the spindle body and a second position outside the spindle body, wherein the method comprises the following steps:
   a. releasing a spring strout of the entraining blade from a radial opening of the spindle body,
   b. pulling out the entraining blade from the axial recess and
   c. manually inserting and fastening a different entraining blade in the axial recess of the receiving section, in which the one spring strout of the entraining blade latches into the radial opening.

16. A method for replacing a spindle body in a tool for installing or removing a wire thread insert according to claim 1, which comprises the following features: the spindle body having a driving section by means of which the spindle body can be rotated about a longitudinal axis and which is not integrally connected to a tool holder or a collet, a receiving section arranged at the end and facing away from the driving section, in which receiving section a thread is provided for screwing on or a threadless surface for plugging on the wire thread insert onto the receiving section is provided, and having an axial recess which extends in the interior of the spindle body over a length, an entraining blade with an engaging end, which is arranged at least axially displaceable in the axial recess at least in the portion of the receiving section, and an elongated actuator which is arranged movably in the longitudinal direction within the axial recess so that the engaging end of the entraining blade can be displaced by means of the actuator between a first position within the spindle body and a second position outside the spindle body, wherein the method comprises the following steps:
   a. removing the entraining blade from the axial recess of the spindle body,
   b. releasing the tool holder or collet, which holds the spindle body rotation-proof on the driving section, and removing the spindle body from the tool, and
   c. inserting and fastening a new spindle body in the tool holder or collet.

17. An installation method for a wire thread insert in a thread opening with a tool according to claim 1 which comprises the following features:
   a. arranging the wire thread insert in the receiving section of the spindle body,
   b. screwing in the wire thread insert by rotating the spindle body into the thread opening in an installation direction,
   c. displacing the actuator within the spindle body in the installation direction and moving an engaging end of the entraining blade in the second position outside the spindle body,
   d. displacing the installation tang from a starting position radially outwards and
   e. unscrewing or pulling the spindle body out of the wire thread insert.

18. The installation method according to claim 17 with the further step:
   displacing the engaging end in the first position by axially moving the actuator.

19. The installation method according to claim 17 with the further step:
   axially displacing the actuator against the installation direction and releasing the engaging end of the entraining blade from the engagement with the wire thread insert.

20. The installation method for a wire thread insert in a thread opening with a tool according to claim 1, which comprises the following features:
   a. arranging the wire thread insert in the receiving section of the spindle body,
   b. displacing the actuator within the spindle body in installation direction and moving an engaging end of the entraining blade into engagement with the wire thread insert,
   c. screwing in the wire thread insert by rotating the spindle body into the thread opening in an installation direction,
   d. unscrewing or pulling the spindle body out of the wire thread insert.

* * * * *